Dec. 7, 1965    R. V. MOSER ETAL    3,221,479
LINT ARRESTER
Filed July 10, 1961    5 Sheets-Sheet 1
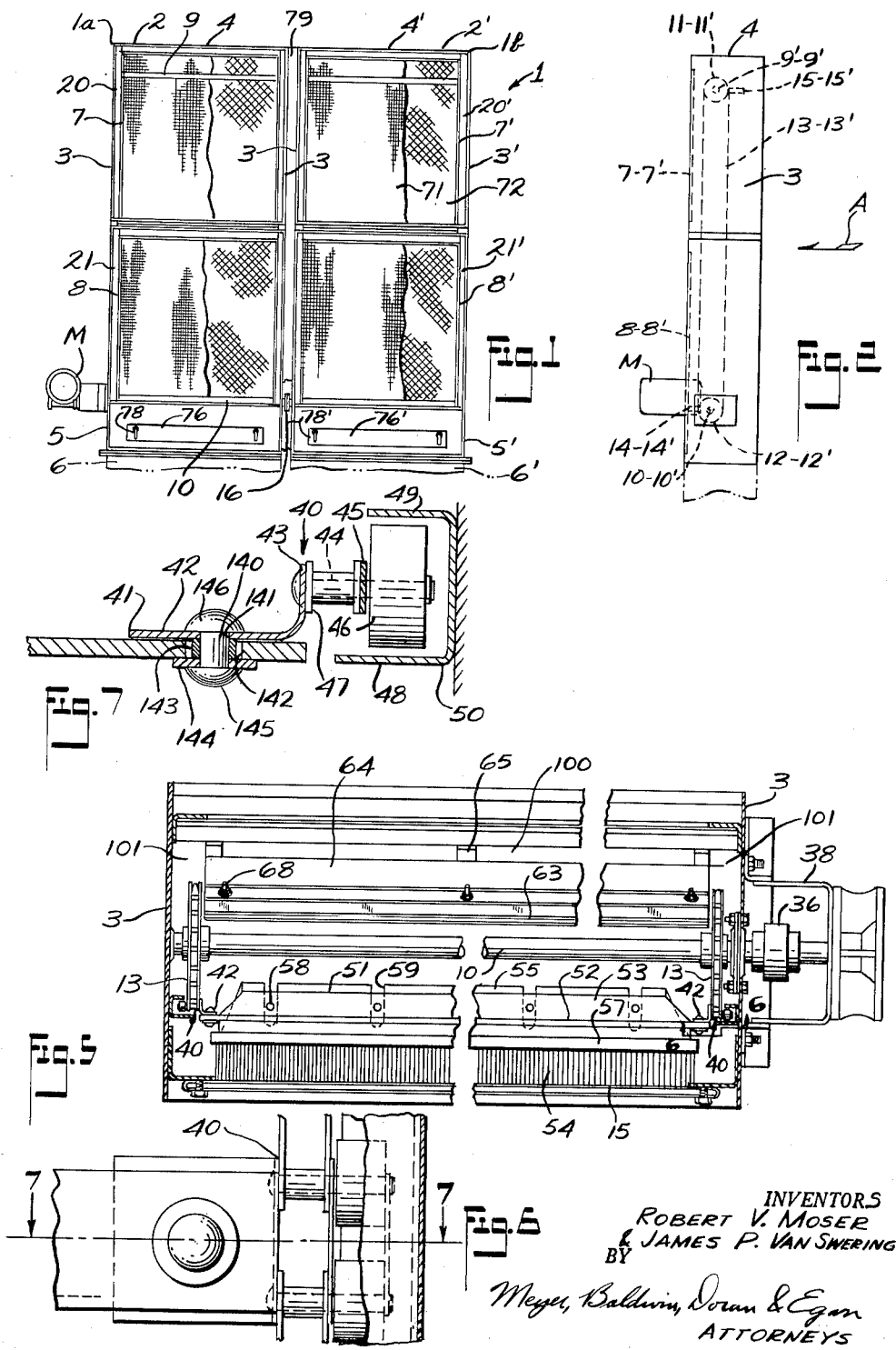
INVENTORS
ROBERT V. MOSER
& JAMES P. VAN SWERINGEN
BY
Meyer, Baldwin, Doran & Egan
ATTORNEYS

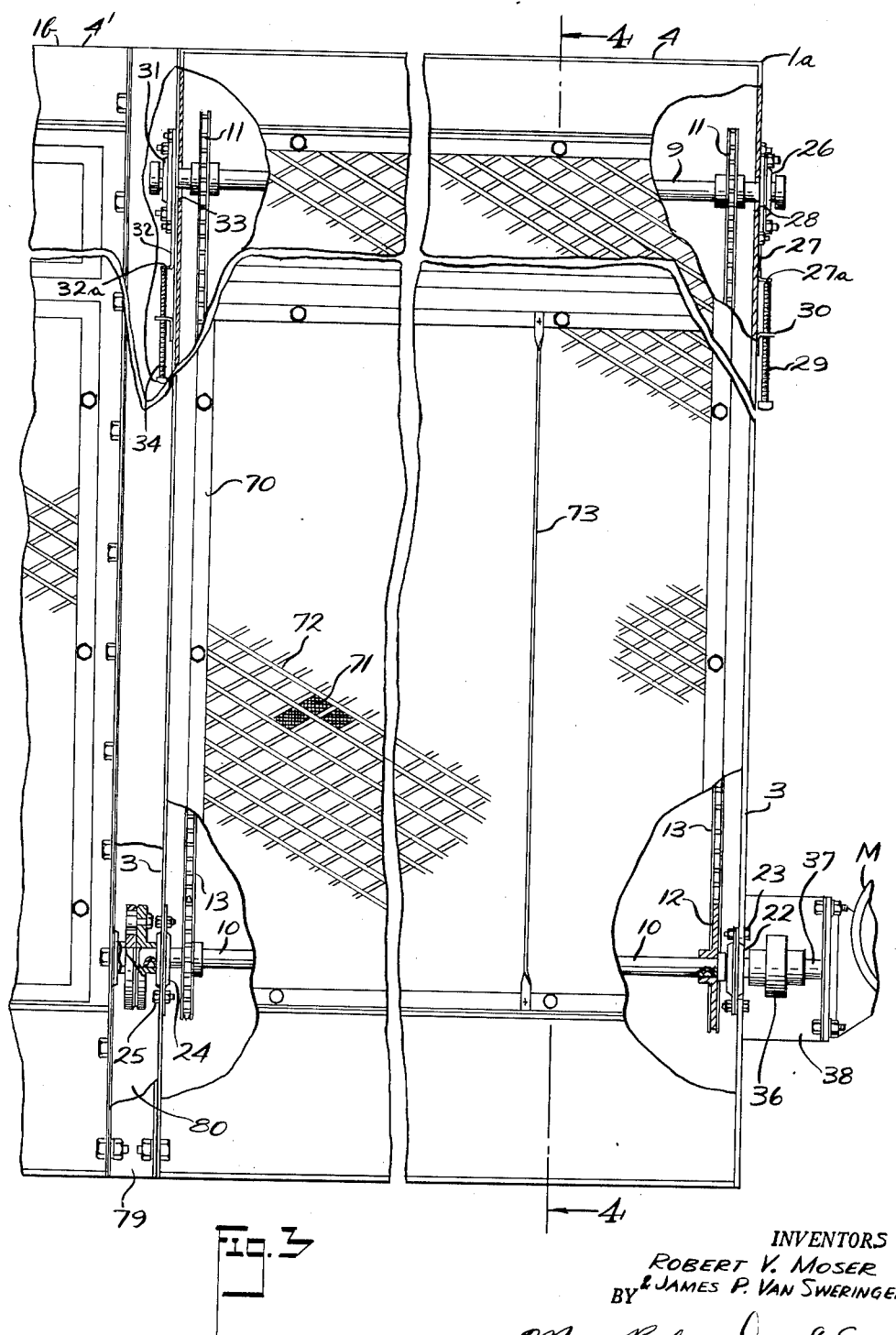

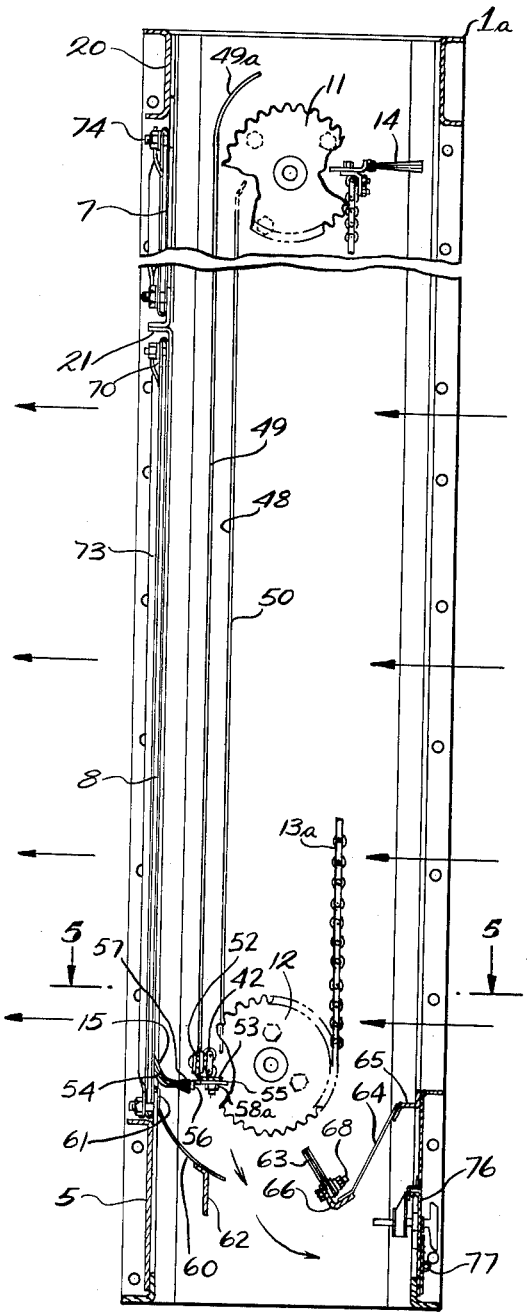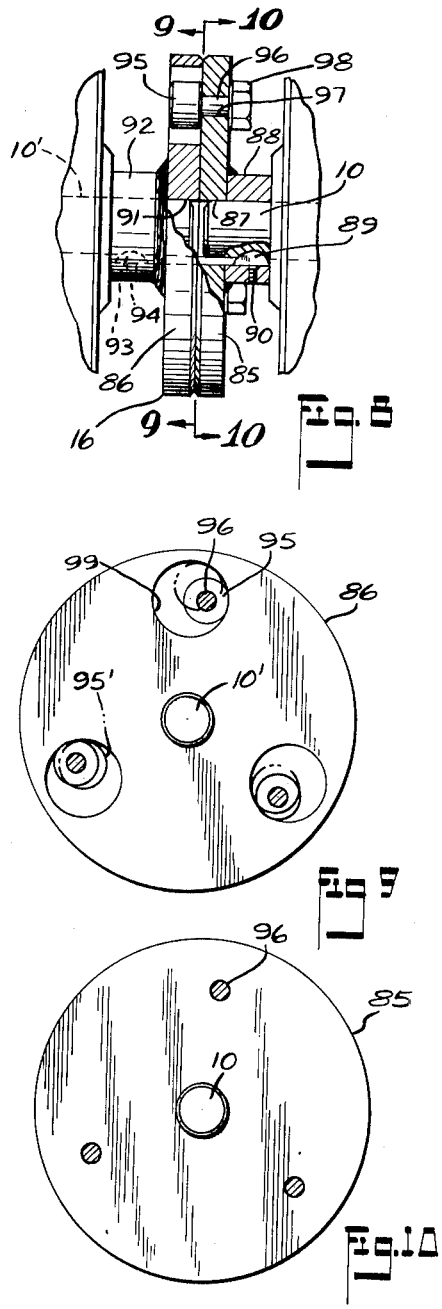

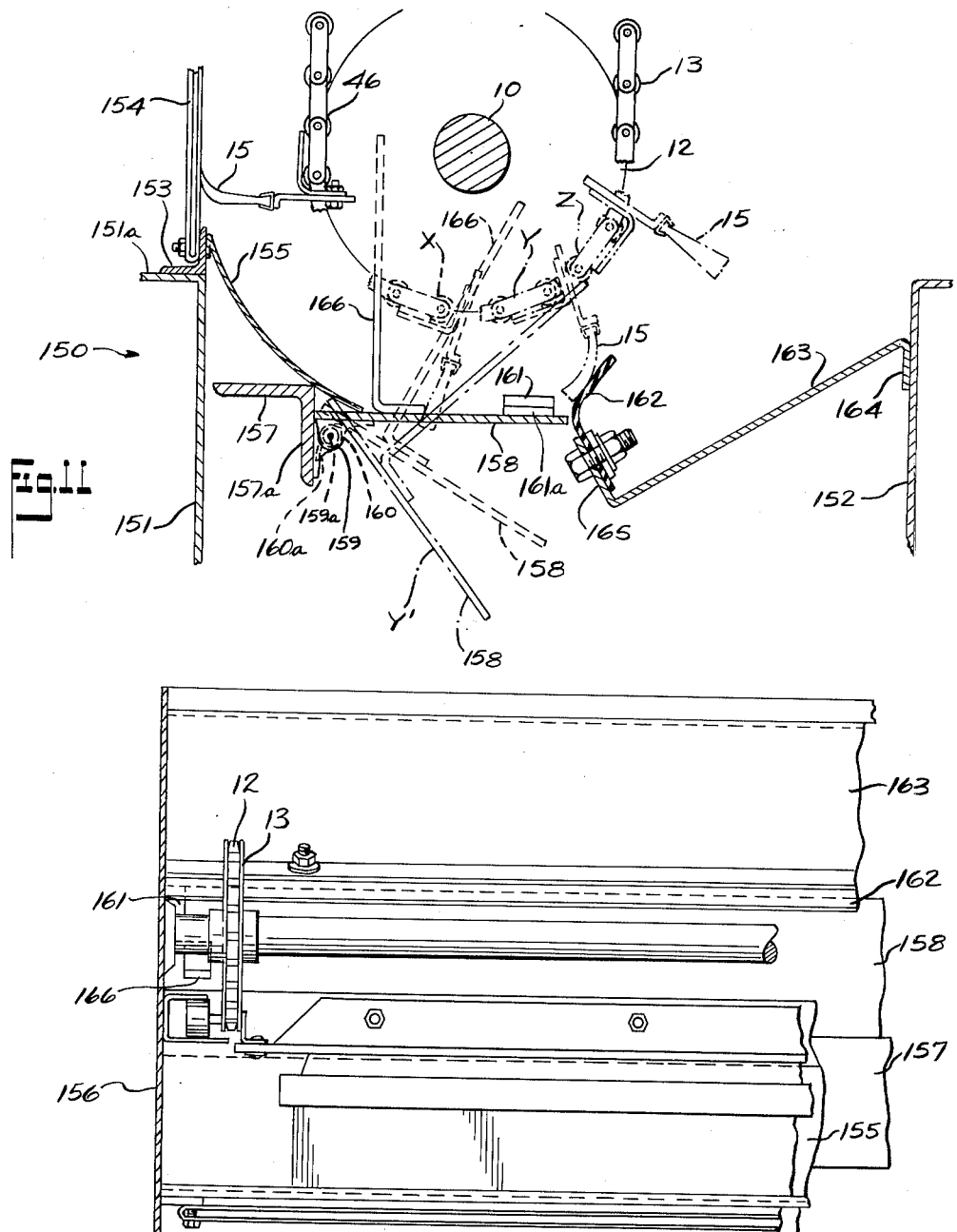

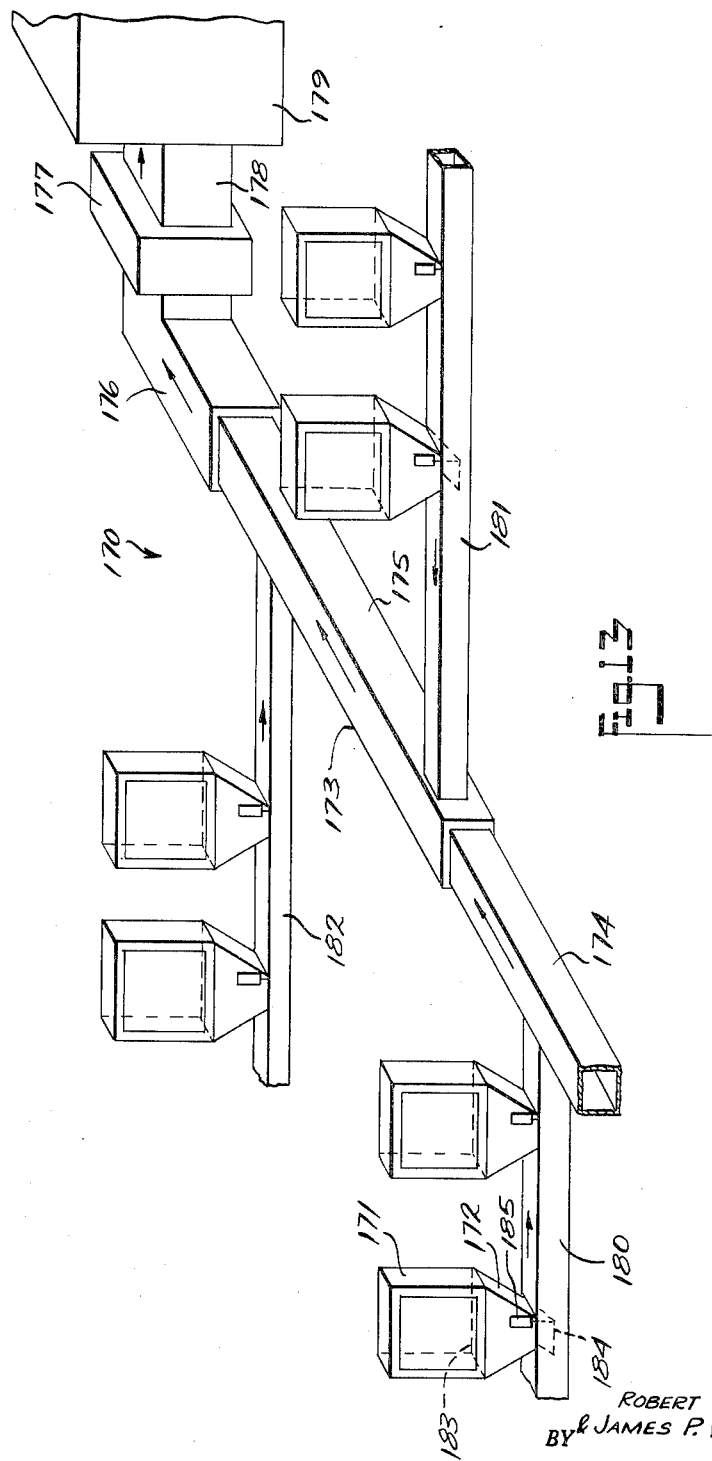

United States Patent Office 3,221,479
Patented Dec. 7, 1965

3,221,479
LINT ARRESTER
Robert V. Moser, Northfield, and James P. Van Sweringen, Cleveland Heights, Ohio, assignors to Rockwell-Standard Corporation, Cleveland, Ohio, a corporation of Pennsylvania
Filed July 10, 1961, Ser. No. 122,850
5 Claims. (Cl. 55—296)

This invention relates to filtering apparatus for removing contaminants from an air stream and more particularly to an automatic, self-cleaning lint arrester.

Although the invention is not limited to any specific use, the lint arrester as herein illustrated and described is particularly designed for removing heavy concentrations of coarse, bulky materials such as lint, chaff, leather cuttings, feathers, and the like from a large volume of moving air. Such device is useful, for example, in a textile manufacturing plant wherein the problem of a large amount of lint circulating with the air is present at every stage of production. Textile plants are commonly air conditioned due to the necessity of maintaining rigid controls over the temperature and humidity during the various manufacturing processes, and excessive lint or fibers in the air quickly clog and disable the air conditioning apparatus. It is, therefore, important that the air be maintained free of the lint, and filters are widely widely used to accomplish this end.

However, since the filtering apparatus itself also becomes quickly clogged with lint due to the heavy concentration of the contaminants, it is necessary either to continually replace the filter element used or to clean the lint therefrom with sufficient frequency to prevent it from becoming so packed with the fibers as to inhibit the flow of air therethrough.

Additionally, it is highly desirable that the lint trapped by the filtering apparatus be recovered whereby it may be used for the manufacture of other textile products, paper, or the like.

It is, therefore, the general object of this invention to provide a filtering apparatus capable of disentraining heavy concentrations of contaminants from a large volume of flowing air without becoming clogged by the filtered material and having means for recovering such material for future use.

More specifically, it is an object of the invention to provide a filtering apparatus of the above type which includes power driven brush means passing periodically and automatically over the collecting side of filter panel means to remove material collected thereon whereby the air flow through the filter remains uninhibited.

It is a further object of the invention to provide a filtering apparatus having the above characteristics wherein means is provided for wiping the brush means to remove material adhering thereto subsequent to each passage of the brush across the filter.

Another object is to provide, in such filtering apparatus, storage means for receiving the collected material, said storage means being so positioned that said material does not re-enter the air stream passing through the filter.

A still further object of the invention is to provide a filtering apparatus which utilizes a portion of the air stream passing therethrough to aid in collecting and depositing disentrained particles.

Still another object is to provide a filtering apparatus of the type described comprising a plurality of like filter units which are adapted to be readily connected side-by-side for increasing the effective filtering area.

Yet another object is to provide in such connected units simple and effective coupling means whereby all of the brush means are driven from a single power source.

A further object is to provide coupling means of the above type which effectively adjusts to slight misalignments of the connected units without adversely affecting the power driving of the brush means.

Other objects of the invention and the invention itself will be readily understood from the following specification and the accompanying drawings, in which said drawings:

FIG. 1 is a front elevation of a filtering apparatus comprising a pair of filter units connected side-by-side for unitary operation;

FIG. 2 is a side elevation of the apparatus of FIG. 1 as seen from the left-hand side thereof;

FIG. 3 is an enlarged, partially cut away, back elevation of one of the units of FIG. 1;

FIG. 4 is a vertical section taken along the line 4—4 of FIG. 3;

FIG. 5 is a horizontal section taken along the line 5—5 of FIG. 4;

FIG. 6 is an enlarged section taken along the line 6—6 of FIG. 5;

FIG. 7 is a section taken along line 7—7 of FIG. 6;

FIG. 8 is an enlarged view in partial section of the coupling means of this invention;

FIG. 9 is a vertical section taken along the line 9—9 of FIG. 8;

FIG. 10 is a vertical section taken along the line 10—10 of FIG. 8;

FIG. 11 is an enlarged detailed section of a modified form of the lint depositing portion of one lint arrester;

FIG. 12 is a fragmentary view similar to FIG. 5 of the modification shown in FIG. 11; and FIG. 13 is a schematic showing of a plurality of filter units connected into an automatic unloading system.

Referring now to the drawings in all of which like parts are designated by like reference numerals, FIGS. 1 and 2 generally illustrate a filtering apparatus 1 comprising a pair of filter units 2 and 2' positioned side-by-side and so interconnected as to operate in unison.

The filter units 2—2' comprise, in general, housings 1a and 1b having side walls 3—3' and upper, horizontal walls 4—4', said housings being seated upon hollow bases 5—5' beneath which are provided receptacles or hoppers 6—6'. As best shown in FIG. 2, the side walls 3—3' and upper walls 4—4' are relatively narrow, and the housings are open through the horizontal dimension parallel with said side walls whereby a stream of air may flow therethrough.

The stream of air from which contaminants are to be filtered enters the housings 1a–1b at the open front thereof from the direction as indicated by the arrow A and leaves said housings after passing through a pair of vertically disposed, coplanar arresters 7–8 and 7'–8'. The arresters are filter panels adapted to disentrain contaminants such as lint and the like from the air flowing through the housings.

A pair of parallel, rotatably mounted shafts 9 and 10 are mounted between the side walls 3 adjacent the upper and lower ends respectively of the housing 1a. The ends of the shafts 9 and 10 are provided respectively with sprockets 11 and 12 which are positioned adjacent the side walls 3 and are vertically connected by sprocket chains 13. The lower shaft 10 is drivingly connected to a motor M which is mounted to the housing 1a adjacent the left-hand side of the filter unit 2 as seen in FIG. 1. The housing 1b is similarly provided with upper and lower rotatable shafts 9' and 10' having mounted thereto sprockets 11' and 12' which drivingly interengage the two shafts by means of sprocket chains 13'. Since the shafts 9—9' and 10—10' and their associated parts are aligned as seen in FIG. 2, these identical parts as shown are indicated by both the unprimed and the primed numbers thereof.

The pairs of chains 13—13 and 13'—13' provide means for mounting a pair of elongated, horizontally disposed brushes 14–15 and 14'–15'. Said brushes are connected to and travel with the pairs of chains 13—13 and 13'—13' and project outwardly from said chains whereby they are caused to alternately pass downwardly across the front or lint gathering surfaces of the arresters 7–8 and 7'–8' to periodically and automatically remove the lint or other contaminants collected thereon.

The motor M drives both said brushes, said motor directly driving the lower shaft 10 of the housing 1a, and said shaft 10 in turn driving the lower shaft 10' of the housing 1b through a coupling 16.

From the foregoing, it will be readily seen that the filtering apparatus of this invention generally comprises a hollow housing which is open completely through from front to back having arresters or filters mounted on the downstream side of said housing for collecting contaminants from the air, said apparatus providing continuously acting brush means for removing the lint which collects upon the arresters.

The housings 1a and 1b and their associated parts are substantially identical, and for that reason only housing 1a will be described in detail. To facilitate the mounting of a plurality of the arresters 7 and 8 whereby a filter unit 2 may be expanded upwardly to suit a given purpose, the housing 1a is built-up from a pair of superposed frame portions 20 and 21 adapted to individually mount the arresters 7 and 8 respectively. It is understood, of course, that the housing 1b is similarly built-up from individual frame portions 20' and 21'. The coplanar sides of the frame portions 20–21 and 20'–21' provide the above mentioned side walls 3 and 3'. The uppermost frame portions 20 and 20' are closed at the top by the upper walls 4 and 4' but are open at the bottoms thereof in communication with the lower frame portions 21 and 21'. Said lower frames are in turn open at the bottoms thereof in communication with the hollow bases 5 and 5'.

The lower shaft 10 is rotatably mounted within the outermost side wall 3 by means of a bearing 22 secured to said side wall by bolts 23. The opposite end of said shaft 10 is rotatably mounted in the opposite side wall 3 adjacent the housing 1b by means of a bearing 24 which is fastened to the adjacent side wall by means of bolts 25. The parallel, upper shaft 9 is rotatably mounted in a bearing 26 which is mounted upon a slide 27 slidably mounted upon the outer surface of the adjacent side wall 3. The shaft 9 projects through the side wall 3 through a vertically elongated slot 28, and a vertically disposed adjusting screw 29 is thread-fitted within an outwardly projecting bracket 30 of the side wall in such manner as to dispose the upper end of the adjusting screw beneath an outwardly projecting lug 27a of the slide 27. The opposite end of the shaft 9 is similarly rotatively mounted within a bearing 31 which is, in turn, mounted upon a slide 32. The shaft 9 projects through a vertically elongated slot 33 in the opposite wall 3 whereby it is vertically adjustable by means of an adjusting screw 34 thread-fitted into a bracket 35 and abutting a lug 32a of the slide 32. It will be readily appreciated that by means of the adjusting screws 29 and 34, the shaft 9 may be vertically adjusted for the purpose of varying the tension of the sprocket chains 13.

The shaft 10 is driven through a connector 36 from a drive shaft 37 of the motor M. Said motor is secured to the outer surface of the outermost wall 3 by any suitable means such as a bracket 38. The motor M drives the shaft 10 through the drive shaft 37 and the connector 36, and this in turn drives the shaft 9 through the upper sprockets 11 and the chains 13.

The chains 13 comprise a plurality of conventional sprocket chain links 13a certain of which are specially modified for the purpose of mounting thereto the brushes 14 and 15. One of these special links is illustrated in detail in FIGS. 6 and 7, and it will be understood that all of the brush mounting links are identical therewith.

FIG. 5 shows in top plan view the brush 15 which is mounted between the parallel chains 13 by means of a pair of brush mounting links 40. Each link 40 comprises an angled mounting bracket 41 having a flat mounting portion 42 and a right angularly bent connector portion 43. A pair of elongated pins 44 project outwardly from each connector portion 43 in the opposite direction from the mounting portions 42, said pins being interconnected adjacent the medial portions thereof by means of second, flat connector portions 45. The connector portions 43 and 45 are rigidly connected to the parallel pins 44, said pins projecting beyond the connector portions 45 a substantial distance and having rotatively mounted thereupon pairs of rollers 46, as shown in FIG. 7. Each pin 44 is, of course, connected to one of the conventional links 13a by means of connector portions 47 of said conventional links through the ends of which said pins project.

The rollers 46 are adapted to travel between inwardly projecting side portions 48 and 49 of roller guide members 50 mounted upon the inner surfaces of the side walls 3. As best shown in FIG. 4, each roller guide member 50 is disposed parallel with the arresters 7 and 8 a short distance forwardly of said arresters at the optimum location for passing the brush 15 downwardly in a brushing motion across said arresters.

Each side portion 49, as shown in FIG. 4, extends from a curved portion 49a thereof which is disposed adjacent the top of each sprocket 11 downwardly in front of the arresters to adjacent the associated lower sprocket 12. Each side portion 48 extends vertically parallel with the side portion 49 generally from the level of the sprocket axis 11 to the level of the sprocket axis 12. In other words, each roller guide member 50 has a straight, captive track or guide comprising the side portions 48 and 49 which is parallel with the plane of the arresters 7 and 8 and through which each pair of rollers 46 of each brush mounting link 40 must respectively travel during the time when one of the brushes 14 or 15 is passing across said arresters.

The brush 15 is mounted laterally between the chains 13 by means of the mounting portions 42 of the brush mounting links 40 which are mounted respectively to said parallel chains. The means for mounting said brush comprise a support member 51 which is angular in section having a flat, vertically disposed mounting portion 52 connected at the ends thereof flatwise to the mounting portion 42 of the brush mounting links 40, and an integrally formed, right angularly disposed carrier portion 53 which projects forwardly away from the arresters 7 and 8 in the position of FIG. 4. As shown in FIG. 5, the carrier portion 53 is tapered adjacent the ends thereof next to the brush mounting links 40 thereby providing adequate clearance between the ends of the carrier portion and the chains 13 and their associated sprockets 11' and 12'. The mounting portion 52 is maintained at all times, in its passage around the sprockets, tangential with the outer periphery of said chain by means of the mounting portions 42 of the brush mounting links 40.

The ends of the mounting portion 52 of the support member 51 are secured to the mounting portion 42 of the angled mounting bracket 41 by means of rivets 140 which project through closely fitting apertures 141 in said mounting portions 42 and relatively large apertures 142 of said mounting portions 52. A small bearing member 143 is telescoped over each rivet 140 and is retained thereon by means of a washer 144 beneath an adjacent head 145 of said rivet. The opposite end of each rivet is headed at 146 whereby the mounting portions 42 and 52 are maintained in their assembled relationship. The diameter of the large aperture 142 is substantially larger than the outer diameter of the bearing member 143 whereby the support member 51 is afforded a slight movement endwise or vertically relative to angled mounting brackets 41. This allows a limited floating movement of the associated brush whereby it may automatically make minor adjustments to varying degrees of resistance provided by the lint gathered upon the arresters, and it also prevents any tendency for the mounting portion 52 to bind or place an undue strain upon the special brush mounting links 40.

The brush 15 comprises a multiplicity of bristles 54 carried by a brush holder 55. The brush holder 55 is a flat, elongated platelike member adapted to be positioned flatwise against the downwardly directed surface of the carrier portion 53 as shown in FIG 4. The rearwardly directed, transversely disposed edge of the said brush holder projects rearwardly in the direction of the arresters 7 and 8 and is there provided with a downwardly turned lip 56 the rearwardly directed surface of which carries an elongated, channel shaped metal backing 57 which extends substantially the distance between the chains 13 and carries the bristles 54. Downwardly projecting bolts 58 are provided in the carrier portion 53, said bolts projecting downwardly through forwardly open slots 59 of the platelike brush holder 55. It will be clearly seen that said brush holder is held in a position perpendicular to the arresters 7 and 8 as the brush is passed over said arresters, and the slots 59 allow a forward and rearward adjustment of the brush whereby the pressure of the said brush upon the arrester may be adjustably determined. The brush holder 55 is maintained in any desired adjusted position by means of the bolts 58 and associated nuts 58a. It will be noted that the brush holder 55 is also tapered adjacent the ends thereof as shown in FIG. 5 thereby obviating any interference with the adjacent chains 13.

The brush 14 is identical in every respect to the brush 15 and is identically mounted to the chains 13. Any number of brushes 14 and 15 may be used, the illustrations herein showing two by way of example.

Referring now to FIG. 4, the brushes 14 and 15 are carried downwardly into the base 5 after each passage across the arresters 7 and 8 where they follow an arcuate path as the brush mounting links 40 are engaged by the lower sprocket 12 and carried at the peripheral edges of said sprockets around to the opposite straight portion of the chains 13. As each brush approaches the lower edge of the arrester 8, it has collected a substantial amount of lint or the like which is to be deposited into the base 5 from which it falls downwardly into the hopper 6. An arcuately curved guide plate 60 is provided inside the housing 1a just below the arrester 8 whereby the lint just collected is conveyed inwardly toward the medial region of the base before being deposited. The guide plate 60 is curved about a center coaxial with the lower shaft 10 and extends across the housing from one side wall 3 to the other. The upper edge of the guide plate 60 has a flattened portion 61 whereby it abuts the arrester 8 adjacent the lower end of said arrester. The downwardly and inwardly directed end portion of said guide plate is supported by an angled brace 62 which is connected adjacent the ends thereof to the inner surfaces of the walls 3.

The brushes 14 and 15 are so adjusted relative to the arresters as to cause the bristles to be slightly flexed thereby exerting some pressure on the arrester. The guide plate 60 is so positioned as to provide for a continued flexing of each brush as it passes downwardly below the arrester 8 whereby the collected material is firmly dragged in an arcuate path downwardly and inwardly across said guide plate into the vicinity of the center of the base 5. At this point, the brush leaves the lower edge of the guide plate 60, the bristles straighten, and the collected lint drops away into the base 5.

Some of the lint collected by one of the brsuhes 14 or 15 tends to cling to the brush, and means is provided for removing such lint in the form of a flexible wiper blade 63 positioned in the arcuate path of the brushes. The wiper blade 63 is made of a suitable flexible material such as plastic or the like having substantially a flexibility similar to that of the bristles 54 and being mounted within the housing 1a upon the downwardly and obliquely inwardly directed end of a baffle 64. The baffle 64 is made of sheet metal or the like and is disposed across the housing 1a between the side walls 3, said baffle being of such length that the ends thereof are spaced a substantial distance from said side walls as best shown in FIG. 5. The baffle 64 is connected at its upper edge to the forwardly disposed wall of the base 5 by means of a plurality of brackets 65. The brackets 65 are welded or otherwise suitably secured to the base wall, and the baffle is positioned inwardly therefrom a short distance. The downwardly and inwardly directed edge of the baffle 64 is provided with an angle bracket 66 which is welded or otherwise suitably secured thereto and which extends throughout the length of said baffle. The flexible wiper blade 63 is also the same length as the baffle 64 and is mounted upon the angle bracket 66 by means of an elongated retainer strip 67 and a plurality of spaced bolts 68.

As best shown in FIG. 4, the wiper blade 63 projects obliquely upwardly in the general direction of the center of the lower sprocket 12 whereby it substantially overlaps the arcuate path followed by the brush 15 thereby causing the bristles 54 to pass over and flex the wiper blade 63 as it passes by. Since the bristles 54 and the wiper blade 63 are of about the same degree of flexibility, each member will flex about the same amount as the two pass each other. The upwardly directed edge of the wiper blade 63 completely wipes the brush throughout substantially the entire length of the bristles 54 thereby removing all of the collected material which remains on the brush. It will be understood that the wiper blade 63 acts in exactly the same manner when the brush 14 passes thereby.

From the foregoing it will be seen that as each brush passes downwardly over the front or lint collecting surfaces of the arresters it progressively brushes the lint off of the arresters and collects it in front of the moving brush. The lint is then dragged downwardly and inwardly across the guide plate 60 at the end of which most of the lint is dropped off into the base 5 and subsequently into the hopper therebelow. Such lint as remains upon the brush is then wiped off by the flexible wiper blade 63 whereby the brush is thoroughly cleaned and ready for the next pass across the arresters.

As best shown in FIGS. 1 and 4, the arresters 7 and 8 are identically constructed and each one comprises a channel shaped frame 70 around the edges of the arrester, the said channel shaped frame serving as retaining means for a layer of fine mesh screen 71 and a layer of relatively open, expanded metal 72. The screen and expanded metal are positioned in flatwise contact with each other and are rentained at the edges thereof within the surrounding channel of the frame 70. A plurality of reinforcing bars 73 connect the upper and lower edges of the channel shaped frame 70 across the rearwardly directed surface of each arrester to provide strength and rigidity to said arrester. Each arrester is mounted within its respective frame portions 20 or 21 by means of a plurality of bolts as indicated at 74.

It will be noted that the fine mesh screen layer 71 is positioned on the forwardly directed side of each arrester, and it is upon this surface that the contaminant collects and across which the brushes 14 and 15 pass to collect the material therefrom. The expanded metal layer 72 in cooperation with the reinforcing bars 73 serve to maintain the fine mesh screen 71 in a flat position whereby it does not bulge in the direction of the air stream either from the movement of said air or the pressure of the brushes passing thereacross.

It will also be noted in FIGS. 1 and 4, that the forwardly directed wall of the base portion 5 is provided with an access door 76 which is hinged at the bottom edge thereof as indicated at 77 and is provided with handles and latch members 78 for holding said door in closed position. Similarly, the forwardly positioned wall of the base portion 5' is provided with an access door 76' and handles and latch members 78'.

As best shown in FIGS. 1 and 3, the housings 1a and 1b are laterally spaced from each other a short distance to allow space between the adjacent side walls 3 and 3' for the outwardly projecting shaft bearings and their associated parts as well as the coupling 16. The housings 1a and 1b are connected adjacent the front and rear thereof by relatively narrow, connector wall portions 79 and 80 whereby this space between the housings is sealed off from the lint or other contaminant thereby preventing such contaminant from passing between said housings.

The coupling 16 which connects the power driven shaft 10 with the shaft 10' is well shown in FIGS. 3, and 8–10. The coupling 16 comprises a pair of disk shaped coupling halves 85 and 86 which are mounted upon the ends of the lower shafts 10 and 10' respectively. The coupling half 85 is centrally apertured at 87, said aperture being surrounded by a collar 88 which projects in the direction of the housing 1a. The end of the shaft 10 projects into the collar 88 and the aperture 87, and the coupling half 85 is caused to rotate with the shaft 10 by means of a key 89 held in position by means of a set screw 90. Similarly, the coupling half 86 is apertured at 91 and has a collar 92 projecting in the direction of the housing 1b, said collar and aperture adapted to receive the end of the shaft 10'. The shaft 10' and the coupling half 86 are keyed for unitary rotation by means of a key 93 held in position by a set screw 94. The flat faces of the coupling halves 85 and 86 opposite the collar thereof are adapted to ordinarily contact each other in flatwise engagement or to be at least closely adjacent.

The coupling half 85 is provided with a plurality of roller bearings 95 which are mounted upon shafts 96 seated in suitable apertures 97 of said coupling half, said shafts being maintained therein by nuts 98. The roller bearings 95 are spaced radially outwardly from the axis of the coupling half 85 an equal distance and are circumferentially evenly spaced adjacent the outer periphery of said coupling half. There are, in the embodiment shown, three of the roller bearings 95, and they project in the direction of the opposed coupling half 86 whereby said roller bearings are generally coplanar with the latter coupling half.

The coupling half 86 is provided with three enlarged apertures 99 of substantially greater diameter than the roller bearings 95, said apertures being so radially and circumferentially spaced as to loosely receive the said roller bearings. As best shown in FIG. 9, the roller bearings 95 each contact a point on the margin of an associated aperture 99 when the shaft 10 is rotated thereby inducing a similar rotation in the coupling half 86 and its associated shaft 10'. The full line showing of the roller bearings illustrates the driving position of said bearings when the shafts 10 and 10' are coaxially aligned whereby the axes of said roller bearings define a circumferential path coincidental with a circumferential path defined by the centers of the apertures.

However, the above described arrangement allows a driving relationship between the shafts 10 and 10' even when said shafts are not in perfect coaxial alignment. The crossed center lines shown as X in FIG. 9, locate a supposed axis of the shaft 10 which is quite obviously out of alignment with the axis of the shaft 10'. With the said shafts in this relative position, the roller bearings 95 would have driving positions as illustrated by the dotted or broken line showings designated 95'. In other words, the enlarged apertures 99 allow the roller bearings 95 to shift slightly out of alignment with said apertures without interfering with the driving relationship between said roller bearings and said apertures. Due to the fact that the roller bearings 95 rotate, there is no scraping or undue wear between said roller bearings and marginal edges of the apertures 99 as said bearings change positions within said apertures during the rotational movement of the coupling. The roller bearings 95 simply roll against the inner margins of the apertures as the coupling 16 rotates.

Referring now to FIGS. 4 and 5, the air current carrying the lint or other contaminant enters the filter unit 1 through the front, unobstructed open side of the housings 1a and 1b and passes between the chains 13 or 13' and outwardly through the arresters 7–8 or 7'–8'. The air flow first strikes the fine mesh screen 71, and the lint or contaminant impinges upon and is retained by said screen. Subsequent brushing action of the brushes 14 and 15 convey the lint that is collected downwardly toward the bases 5 or 5' as herein above described.

As exemplified in the housing 1a, a portion of the air flow is utilized to aid in depositing the collected lint into the hopper 6. The arresters 7 and 8 create a partial resistance in the flow of the air whereby a portion thereof is directed downwardly toward the base 5 as indicated by the arrows adjacent the lower end of FIG. 4. The guide plate 60 serves the additional function of acting as a baffle in directing this partial air flow downwardly so that it enters between the inwardly directed edge of said guide plate and the wiper blade 63. Said guide plate and wiper blade form a restricted opening at this point thereby causing the air to flow downwardly at an increased speed in this area. The downward draft and the increased velocity of the air conveys the collected lint downwardly as it is brought by one of the brushes into the area between the guide plate 60 and the wiper blade 63. The area below said guide plate and wiper blade is substantially larger than the restricted opening through which the downdraft came thereby affording a sudden decrease in pressure and a slowing of the air current. This causes the lint to drop downwardly away from the swirling air. Subsequently, the air returns, as indicated by the arrows of FIG. 4, up between the baffle 64 and the front wall of the base 5 where it escapes back into the main air flow through the openings between the brackets 65, as indicated at 100 in FIG. 5, and around the ends of the baffle 64 through the spaces between said ends and the side walls 3 as indicated at 101.

FIGS. 11 and 12 show an alternate mechanical arrangement for closing off the top of the base just below the lower shaft and sprockets which provides therein a trap door adapted to open and remain open during the time that the brush passes over the hopper and is engaged by the wiper. FIG. 13 illustrates a vacuum type automatic unloading system for a plurality of filtering units wherein the closing off of the base above the hopper is an important factor to the unloading operation.

In general, the unloading system of FIG. 13 comprises an arrangement of connected ducts to which vacuum or suction is applied by a common blower for drawing off the collected lint or other contaminant and depositing it in a storage bin. The lower ends of hoppers of a plurality of filtering units are connected in parallel with the duct work, and it can be readily appreciated that to maintain a maximum suction in the system, the various individual hoppers should be closed off.

Additionally, under certain adverse conditions, the downward flow of air into the hopper as previously described cannot be effected or is intermittently disturbed by something outside the apparatus itself. Such interference might occur where there is an air turbulence in the room where the filtering apparatus is located such as would be caused by another machine, blower, or the like. In this situation, the trap door arrangement of FIGS. 11 and 12 would also be useful.

FIG. 11 shows a modified base 150 of a filtering apparatus, said base comprising a rear wall 151 and a front wall 152. The rear wall 151 has an outwardly turned flange 151a at the upper edge thereof across which is rigidly mounted an angle member 153 to which the lower end of an arrested 154 is secured. In addition to providing attachment means for the arrester 154, the angle member 153 provides means for attaching the upper edge of a curved guide plate 155 which extends downwardly and inwardly of the modified base 150 and projects completely across said base whereby the ends thereof contact side walls 156.

The guide plate 155 is supported adjacent its lower and inner edge by means of an angularly shaped support member 157 which has a depending side portion 157a to which is hingedly mounted a normally horizontally disposed trap door 158. The angular shaped support member 157 also projects completely across the base 150 and is secured by any suitable means to the side walls 156. The trap door 158 is of substantially the same length as the support member 157 and is mounted to the depending wall 157a by means of a hinge 159. The trap door 158 is biased in an upward direction by means of a tensioned coil spring 160 which is disposed over a hinge pin 159a and has suitably extending arms 160a which bear respectively against the depending side portion 157a and the bottom of the trap door 158. Stops 161 are mounted to the side walls 156 and project inwardly therefrom into the path of the trap door 158 thereby maintaining it in a normally horizontal position. The stops 161 are preferably provided with cushioning pads or resilient members 161a on their lower surfaces to cushion the trap door 158 when it closes.

The distal edge of the trap door 158 terminates at approximately the mid-portion of the modified base 150 where it abuts an obliquely angled wiper blade 162 which is carried by a closure plate 163.

The closure plate 163 extends inwardly and downwardly from the front wall 152 of the base 150 and is mounted to said front wall by means of a downwardly turned flange 164. The flange 164 is welded or otherwise suitably secured to the front wall 152, and the closure plate 163 projects completely across between the side walls 156. The distal edge of said closure plate has an obliquely upwardly directed flange 165 to which the flexible, bladelike wiper 162 is mounted. The wiper blade projects upwardly above and slightly over the top of the distal edge of the trap door 158 in such manner that when said trap door is in the normally closed position as shown in full line in FIG. 11, such distal edge of the trap door lightly abuts the wiper blade. It will be understood that the blade 162 also projects completely across between the walls 156 whereby when the trap door 158 is in its normally closed position, the upper end of the base 150 is completely closed.

The modified base 150 is utilized in conjunction with a filtering apparatus which is otherwise identical with that hereinbefore described including the lower shaft 10 mounting sprockets 12 around which pass chains 13 carrying one of the brushes as indicated at 15. The brush 15 is mounted to the chains 13 by means of brush mounting links 40 carrying rollers 46 in the same manner as set forth in connection with the description of the first embodiment.

The trap door 158 is opened as the brush 15 passes thereover and is wiped by the flexible wiper blade 162, the means for opening said trap door comprising a pair of levers 166 mounted upon the upper surface of the trap door 158 adjacent the side walls 156 respectively in alignment with the paths of the rollers 46. The levers 166 project upwardly into the paths of the rollers in such manner and to such extent that the rollers strike the levers and begin pivoting the trap door toward the open position while the brush 15 is still traveling on the guide plate 155. The dotted line showing at X of the brush and roller assembly shows the trap door 158 as it begins to open just after the brush 15 has left the guide plate 155. The dotted line position of the roller and brush assembly as shown at Y shows the lever 166 tilted substantially a maximum amount whereby the trap door 158 is open to the position Y' just as the brush 15 is engaged by a wiper blade 162. The dotted line position Z of the roller and brush assembly illustrates how the trap door 158 is maintained in its maximum open position until shortly after the brush 15 leaves the wiper 162 thereby assuring that said trap door will be open during all of the wiping action. As the rollers pass upwardly away from the dotted line position Z, it will be readily understood that the trap door 158 automatically closes again under the bias of the spring 160. The trap door 158 will remain closed except when a brush passes thereover thereby sealing off the hoppers and preventing the lint from moving upwardly through the base 150 under any of the adverse conditions set forth above.

FIG. 13 shows a duct system generally indicated at 170 into which a plurality of filtering units 171 of the type described are connected. Each unit rests upon a base 172 the lower end of which is connected into the duct work. The individual units 171 may represent units located in separate rooms of a plant or a group or groups of filters placed in line for the purpose of selective filtering.

The duct system 170, as herein illustrated, comprises a main stem portion 173 comprising a plurality of progressively larger duct sections 174, 175, and 176 connected end-to-end with the largest section 176 connected to a blower 177 which in turn is connected to a storage bin 179 through a short duct section 178. Branch duct sections 180, 181, and 182 extend laterally from the stem 173 and in turn connect to the bases 172 of the filtering units 171.

Each filtering unit 171 is provided with the trap door mechanism as illustrated in FIGS. 11 and 12 and as indicated schematically in FIG. 13 at 183 adjacent the upper end of the base 172. The lower end of each base has a discharge door 184 which is hinged to open downwardly into the duct system and is opened by a solenoid 185 operating an arm 186. The discharge doors 184 are normally closed, and when the solenoids 185 are energized, the arms 186 extend to open the associated doors.

From the foregoing, it will be readily seen that the lint or other contaminant initially collects in the bases 172, and upon opening of the discharge doors 184, such contaminant drops into the duct system to be conveyed in the direction indicated by the arrows to the storage bin 179. The duct sections 174, 180, 181, and 182 are open at their distal ends and may be of any length to accommodate any number of filter units.

In a system of the type set forth, it is preferred that all of the discharge doors 184 do not open at the same time. By opening them sequentially, the full suction in the system can be applied to any given contaminant dropped into the duct work. The trap door arrangement 183 at each unit prevents any bypass in the unloading system when one of the discharge doors is open.

Simple electrical means (not shown) may be used to sequentially actuate the solenoids 185 either individually or in groups as desired. For example, in an unloading duct system servicing sixteen individual units, actuation of the solenoids may be so sequentially arranged as to cause each discharge door to open and remain open for 3¾ seconds whereby the contaminant is collected once each minute from each unit. Thus, only one unit is discharged at any one time, and overloading of the system is prevented.

The brushes 14 and 15 must be of sufficient stiffness to effectively remove the lint from the surface of the screen 71 but must not be of such stiffness as to cause the lint to be flipped or brushed out into the air stream thereby offsetting the effectiveness of the brushing action. An excellent brush for the purpose described comprises one having a commercial steel backing made of suitable sheet metal of about .040 inch thickness, said backing being channel shaped to grip the ends of the bristles whereby said bristles have a compressed thickness of substantially .170 inch. When such a brush is provided with .012 inch diameter crimped nylon bristles having a visible material length, or a free, unsupported length, of substantially 1¾ inches, excellent flexing and brushing characteristics are obtained. Nylon has proved to be a particularly desirable material because of its characteristic of great resistance to wear and because there is no tendency for it to be cut by the screen 71 as it passes thereover.

As hereinbefore stated, it is desirable that the wiper blade 63 be of substantially the same flexibility as the brushes 14 and 15. An excellent wiper having the desired flexibility comprises a nylon inserted, neoprene diaphragm sheet material comprising nylon cloth bonded between neoprene sheets and having a thickness of substantially ⅛ inch with an exposed material length beyond the holder of substantially 1¾ inches or the same as that of the crimped nylon bristles. Such a wiper blade will effectively wipe the whole length of the brush bristles.

The filtering apparatus 1, as herein illustrated, comprises a pair of housings positioned side-by-side, each having two arresters placed end-to-end in a vertical plane. These housings may vary in size and may comprise several arresters placed one above the other or a single arrester of any suitable dimensions. The present invention is also readily adapted for expansion laterally by placing more of the housings side-by-side and providing a coupling 16 between each adjacent pair whereby the driving power is delivered to all of the housings. Where as many as four housings are used together, it is anticipated that a desirable arrangement is to have the motor M positioned centrally with two housings positioned on either side thereof and couplings connecting the two outside housings to the two inside housings.

The filtering apparatus as herein illustrated is particularly useful in textile plants where the lint carried by the air in the various processes of manufacture greatly interferes with the proper operation of the plant air conditioning and wherein such lint constitutes a valuable commodity which can be re-used where salvage is possible. The collecting screen 71 may be of any preferred degree of fineness; it has been found that excellent results are obtained with a 30 mesh screen.

It is anticipated, however, that lint arresters of this design may be placed at different positions in the same air stream and provided with filtering screens of relatively different degrees of coarseness for selectively filtering out lint fibers of different sizes. For example, the air may be caused to flow first through an arrester having a relatively coarse or open screen thereby collecting only the larger fibers, such screen allowing the finer material to pass therethrough. Subsequently, the same air stream may be passed through a lint arrester having a relatively finer mesh screen thereby removing from the air lint fibers of smaller dimension. Any number of arresters having progressively finer screens positioned downstream of the air flow may be thus used to collect fibers of selected sizes into various, individual hoppers.

The filtering apparatus as herein described and illustrated is given by way of example only of embodiments of the present invention. It will be understood that many changes may be made in the details as shown without, however, departing from the spirit thereof or the scope of the appended claims.

What is claimed is:

1. A filtering apparatus comprising a planar filter panel for disentraining particles from an air stream; a brush for removing disentrained particles from the upstream side of said filter panel; means periodically passing said brush over the upstream side of said filter panel in use of the apparatus in such manner as to remove the particles therefrom; said means including a mounting plate generally parallel to said panel and said brush having a lost motion connection with said plate comprising pins rigid with said brush passing through holes in said plate of larger diameter than said pins, whereby said brush is mounted to said means in such manner as to have limited movement vertically and horizontally in a plane parallel with the plane of said filter panel; and wiper means engaging said brush after each passage thereof over said filter panel and forceably removing particles adhering to said brush.

2. A filtering apparatus comprising a filter panel for disentraining particles from an air stream; brush means for removing particles from the upstream side of said filter panel; conveyor means periodically passing said brush means in a closed path over said filter panel from top to bottom thereof; open top receptacle means disposed below said panel and slightly upstream therefrom wherein particles collected by said brush means are deposited; a guide plate extending between the bottom of said panel and the side of said receptacle means open top nearer said panel, a wiper means adjacent said closed path and on the upstream side of said receptacle means open top, said receptacle means open top and said guide plate and said wiper means being substantially the full width of said panel; said receptacle means having a door normally substantially closing said receptacle open top between said guide plate and said wiper means; means carried by the door extending into the path of the conveyor means, and means attached to said conveyor means adapted to engage said door carried means for opening said door.

3. A filtering apparatus as set forth in claim 2 including means resiliently biasing said door to a closed position in such manner as to close said door immediately after release of said door carried means by said means attached to said conveyor.

4. A filtering apparatus comprising a housing having means defining an opening through said housing to receive a stream of air; a vertically disposed filter panel mounted in said opening on the downstream side of said housing; receptacle means disposed below said housing; endless conveyor means mounted in said housing on the upstream side of said filter panel above said receptacle means; a brush for removing disentrained particles from the upstream side of said filter panel; mounting means mounting said brush to said conveyor means in such manner as to pass said brush periodically downwardly over the upstream side of said filter panel in use of the apparatus; said receptacle means having an open top through which particles removed from said panel may fall by gravity into said receptacle means; a door normally closing said open top; a wiper disposed adjacent said door in the path of said brush in such manner as to engage said brush and remove particles adhering thereto as said brush passes said door; means carried by the door extending into the path of the conveyor means, and means attached to said conveyor means adapted to engage said door carried means for opening said door.

5. A filtering apparatus comprising a housing having means defining an opening through said housing to receive a stream of air; a filter panel mounted in said opening on the downstream side of said housing; hollow receptacle means in the lower part of said housing and below said panel; said receptacle means having an open top portion spaced upstream from said panel; a brush for removing disentrained particles from the upstream side of said filter panel; means periodically passing said brush downwardly over the upstream side of said filter panel in use of the apparatus in such manner as to remove the particles therefrom and convey them into said receptacle means through its open top central portion; said receptacle means being substantially closed except for its top central portion; a guide plate partially closing said receptacle means top between said central portion and the bottom of said panel; wiper means on the side of said central portion away from said panel and disposed in the path of said brush for removing particles therefrom, baffle means substantially separating the hollow of said receptacle means from said housing on the side of said wiper means away from said panel; and there being a limited opening in said baffle means over which said air stream passes moving toward said panel causing a diverted stream of air to move downwardly on the upstream side of said panel and across said guide plate and into said receptacle means open top and returning to said main air stream through said limited opening, thus carrying particles from said panel into said receptacle means.

References Cited by the Examiner

UNITED STATES PATENTS

| | | | |
|---|---|---|---|
| 519,958 | 5/1894 | Hueffner et al. | 55—296 |
| 719,954 | 2/1903 | Patten | 192—66 |
| 728,954 | 5/1903 | Miller | 192—66 |
| 1,429,006 | 9/1922 | Milharm | 55—296 |
| 1,995,378 | 3/1935 | Dahlman | 55—353 |
| 2,599,842 | 6/1952 | King | 55—296 |
| 2,609,064 | 9/1952 | King | 55—296 |

FOREIGN PATENTS

| | | |
|---|---|---|
| 4,386 | 1888 | Great Britain. |
| 499,045 | 1/1939 | Great Britain. |

HARRY B. THORNTON, *Primary Examiner.*